No. 809,442. PATENTED JAN. 9, 1906.
J. W. HINKLEY.
CREAM SEPARATOR.
APPLICATION FILED JULY 15, 1905.

Witnesses:
Farnum F. Dorsey
Edward S. Day

Inventor:
John W. Hinkley
by his Attorneys
Phillips Van Everen & Fish

UNITED STATES PATENT OFFICE.

JOHN W. HINKLEY, OF WATERTOWN, MASSACHUSETTS.

CREAM-SEPARATOR.

No. 809,442.     Specification of Letters Patent.     Patented Jan. 9, 1906.

Application filed July 15, 1905. Serial No. 269,818.

*To all whom it may concern:*

Be it known that I, JOHN W. HINKLEY, a citizen of the United States, residing at Watertown, in the county of Middlesex and State of Massachusetts, have invented certain new and useful Improvements in Cream-Separators; and I do hereby declare the following to be a full, clear, and exact description of the invention, such as will enable others skilled in the art to which it appertains to make and use the same.

The present invention relates to cream-separators.

It is customary to separate cream from milk by allowing the milk to stand in a receptacle until the cream has risen to the surface and then drawing off the milk through an outlet in the side of the receptacle near its lower end until the cream alone remains. It is important for hygienic reasons that all utensils in which milk is contained or handled should be capable of easy and thorough cleansing and sterilization and that all parts with which the milk comes in contact should be accessible for this purpose.

The object of the present invention is to produce an improved portable cream-separator of the type referred to of simple construction and which may be readily cleansed and sterilized; and to these ends the invention consists in the improved cream-separator hereinafter described, and shown in the accompanying drawings.

Figure 1:
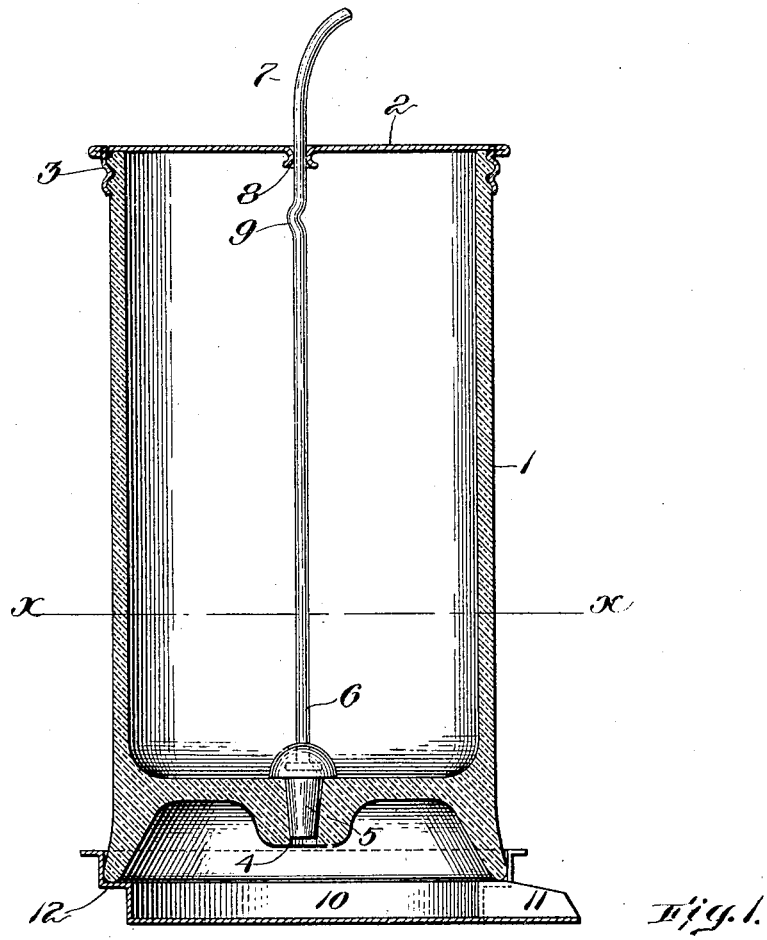
Figure 2:
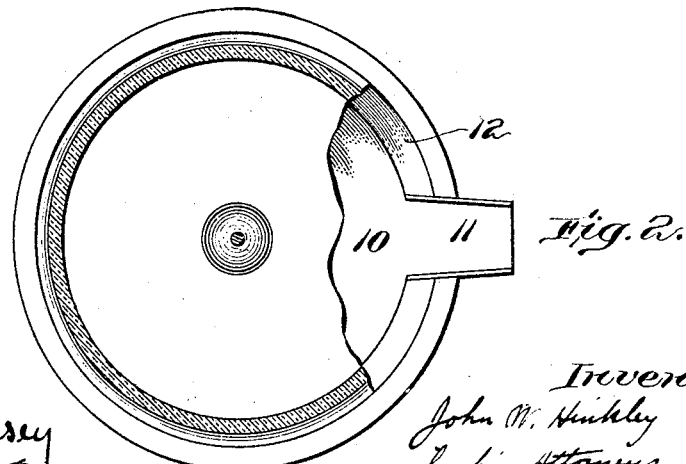

In the drawings, Figure 1 is a vertical section of the preferred embodiment of the present invention; and Fig. 2 is a horizontal section on line $x\,x$, Fig. 1.

The body of the separator in the illustrated embodiment of the invention consists of an integral receptacle 1, preferably of glass, so that the line of demarkation between the milk and cream may be observed and having its lower end shaped to form a base to support the body firmly in upright position. The receptacle 1 is preferably provided with a cover 2 to protect the contents of the receptacle, and this cover, as shown, is secured to the receptacle by the threaded upper extremity 3 thereof, to which the cover is screwed. Cream-separators heretofore devised have been made of metal and have been provided with a faucet or stop-cock in the side wall near the lower end. This faucet or stop-cock is permanently secured to the separator, and not only adds considerably to the cost of manufacture, but gives considerable trouble when the separator is cleaned and sterilized. In accordance with the present invention this faucet or stop-cock is done away with, and the bottom of the receptacle 1 is provided with a vent 4, which may be formed in the process of molding in the body. This vent is normally closed by a stopper 5, preferably of rubber, and in order that the stopper may be removed conveniently to draw off the milk a rod 6 is secured to the stopper and passes upward through the cover 2, having an extremity 7, by which it may be grasped to loosen the stopper. The opening 8 in the cover, through which the rod 6 passes, is located centrally in the cover, so that when the cover is off the stopper may be inserted and the receptacle filled with milk, and the cover may then be replaced and secured by a rotary movement without disturbing the rod or the stopper.

In order to prevent the entire removal of the stopper, the rod 6 is provided with an offset 9, which engages the cover after the rod has been drawn up far enough to loosen the stopper 5 without withdrawing it from the vent 4, the vent and stopper being made conical in shape, so as to afford a passage for the milk without the complete withdrawal of the stopper.

In order to receive the milk flowing from the vent 4, a pan 10 is provided, having a nose 11, through which the milk may be discharged into a suitable receptacle. The pan 10 has also a shoulder 12 located above the bottom of the pan, upon which the body 1 is supported, so that the bottom of the body does not come in contact with the milk in the pan. The pan 10 affords a convenient means for supporting the separator upon a table or bench, the pan resting on the surface of the table, with the nose 11 extending over the edge and discharging the milk into a vessel held beneath it.

The form and position of the vent 4 are such that upon the removal of the stopper the vent, as well as all other portions of the body, may be cleansed and sterilized with convenience. The stopper and rod 6 may also be conveniently cleansed, since they can be removed entirely from the body.

A cream-separator embodying the present invention is particularly applicable to domestic use, but also may be used to advantage in the separation of cream on a large scale.

The invention is not limited to the details of construction of the illustrated embodiment, but may be embodied in other forms broadly defined in the claims.

I claim—

1. A portable cream-separator, having, in combination, a body having its lower end shaped to form a base to support the body firmly in upright position and provided with a vent in the bottom, a stopper for closing the vent, and means connected with the stopper and extending to the top of the body for loosening the stopper to open the vent.

2. A portable cream-separator, having, in combination, a body having its lower end shaped to form a base to support the body firmly in upright position and provided with a vent centrally located in the bottom thereof, a cover arranged to be secured to the top of the body by a rotary movement and provided with a centrally-disposed opening, a stopper for the vent, and a rod secured to the stopper and passing loosely through the opening in the cover.

3. A portable cream-separator, having, in combination, a body with a vent in the bottom thereof, a cover provided with an opening, a stopper for the vent, and a rod secured to the stopper and passing through the opening in the cover, the rod being provided with an offset to engage the cover and prevent entire removal of the stopper from the vent when the cover is in place.

4. A portable cream-separator, having, in combination, a body with a vent in the bottom, means for opening and closing the vent, and a pan, for receiving the liquid discharged through the vent, provided with a shoulder for supporting the body above the bottom of the pan, and with a discharging-nose.

5. A portable cream-separator, having, in combination, a glass body having its lower end shaped to form a base to support the body firmly in upright position and provided with a vent in the bottom and a rubber stopper for closing the vent.

6. A portable cream-separator, having, in combination, a body having its lower end shaped to form a base to support the body firmly in upright position and provided with a vent in the bottom, a stopper for closing the vent, and means connected with the stopper for loosening the stopper to open the vent.

7. A portable cream-separator having, in combination, a body with a vent in the bottom thereof, a cover provided with an opening, a stopper for the vent and a rod secured to the stopper and passing through the opening in the cover, the rod being provided with means to engage the cover and prevent entire removal of the stopper from the vent when the cover is in place.

8. A portable cream-separator, having, in combination, a body with a vent in the bottom thereof, means for opening and closing the vent, and a pan for receiving the liquid discharged through the vent, constructed to receive the lower portion of the body and provided with means to support the body above the bottom of the pan.

In testimony whereof I affix my signature in presence of two witnesses.

JOHN W. HINKLEY.

Witnesses:
   FRED O. FISH,
   FARNUM F. DORSEY.